US008818577B2

(12) United States Patent
Louise et al.

(10) Patent No.: US 8,818,577 B2
(45) Date of Patent: Aug. 26, 2014

(54) METHOD AND DEVICE FOR AUTOMATICALLY PROTECTING AN AIRCRAFT AGAINST AN EXCESSIVE DESCENT RATE

(75) Inventors: Pascale Louise, Toulouse (FR); Emmanuel Cortet, Daux (FR); Erwin Grandperret, Blagnac (FR)

(73) Assignee: Airbus Operations (SAS), Toulouse Cedex (FR)

( * ) Notice: Subject to any disclaimer, the term of this patent is extended or adjusted under 35 U.S.C. 154(b) by 166 days.

(21) Appl. No.: 13/023,917

(22) Filed: Feb. 9, 2011

(65) Prior Publication Data

US 2011/0202207 A1    Aug. 18, 2011

(30) Foreign Application Priority Data

Feb. 16, 2010  (FR) .................................... 10 51073

(51) Int. Cl.
*G05D 1/00*  (2006.01)
*G05D 1/06*  (2006.01)

(52) U.S. Cl.
CPC .................................. *G05D 1/0676* (2013.01)
USPC .............. 701/5; 701/7; 701/8; 701/9; 701/10; 701/11; 244/4 R

(58) Field of Classification Search
USPC .............. 701/5, 7, 8, 9, 10, 11, 390, 4; 244/4, 244/4 R, 17, 15, 138 R
IPC ................................................... G05D 1/0676
See application file for complete search history.

(56) References Cited

U.S. PATENT DOCUMENTS

| 3,715,718 | A | * | 2/1973 | Astengo ......................... 340/970 |
| 3,947,808 | A | * | 3/1976 | Bateman ....................... 340/970 |
| 4,058,710 | A | * | 11/1977 | Altmann ........................... 701/5 |
| 4,060,793 | A | * | 11/1977 | Bateman ....................... 340/970 |
| 4,215,334 | A | * | 7/1980 | Bateman ....................... 340/970 |
| 4,229,725 | A | * | 10/1980 | Reilly ........................... 340/968 |
| 4,551,723 | A | * | 11/1985 | Paterson ....................... 340/946 |

(Continued)

FOREIGN PATENT DOCUMENTS

| EP | 0545473 | 6/1993 |
| FR | 2902081 | 12/2007 |
| FR | 2920231 | 2/2009 |

OTHER PUBLICATIONS

French Republic Institut National de la Propriete Industrielle, Preliminary Search Report, FR 1051073, Dec. 21, 2010 (2 pgs French language and 2 pgs. English translation).

*Primary Examiner* — Stefanos Karmis
*Assistant Examiner* — Michael E Butler
(74) *Attorney, Agent, or Firm* — Wood, Herron & Evans, LLP

(57) ABSTRACT

A device includes means for generating and applying to an aircraft protecting orders avoiding a flight with an excessive descent rate. More specifically, the device includes components configured to perform a series of operations including measuring the current vertical speed and the current height of the aircraft and comparing these flight parameters with a safety envelope defining couples of vertical speed and height that are indicative of an excessive descent rate. If the current vertical speed and height are located in the safety envelope, a protection is triggered by generating protecting orders to remove the aircraft from the safety envelope and applying those protecting orders to control surfaces of the aircraft.

14 Claims, 2 Drawing Sheets

(56) References Cited

U.S. PATENT DOCUMENTS

| | | | |
|---|---|---|---|
| 4,821,982 A * | 4/1989 | Van Patten | 244/76 R |
| 4,841,448 A * | 6/1989 | Ford | 701/10 |
| 4,910,513 A * | 3/1990 | Kelly et al. | 340/966 |
| 4,951,047 A * | 8/1990 | Paterson et al. | 340/970 |
| 5,075,685 A * | 12/1991 | Vermilion et al. | 340/970 |
| 5,136,512 A * | 8/1992 | Le Borne | 701/301 |
| 5,186,416 A * | 2/1993 | Fabre et al. | 244/191 |
| 5,186,419 A * | 2/1993 | Scott | 244/171.3 |
| 5,187,478 A * | 2/1993 | Grove | 340/970 |
| 5,283,574 A * | 2/1994 | Grove | 340/970 |
| 5,377,937 A * | 1/1995 | LaMay et al. | 244/185 |
| 5,666,110 A * | 9/1997 | Paterson | 340/970 |
| 5,816,416 A * | 10/1998 | Tsai | 211/69.1 |
| 5,833,177 A * | 11/1998 | Gast | 244/195 |
| 6,062,513 A * | 5/2000 | Lambregts | 244/175 |
| 6,259,379 B1 * | 7/2001 | Paterson et al. | 340/970 |
| 6,737,987 B2 * | 5/2004 | Conner et al. | 340/946 |
| 6,906,641 B2 * | 6/2005 | Ishihara | 340/946 |
| 2004/0215372 A1 * | 10/2004 | Bateman et al. | 701/1 |
| 2010/0217460 A1 * | 8/2010 | Polati De Souza et al. | 701/18 |

* cited by examiner

METHOD AND DEVICE FOR AUTOMATICALLY PROTECTING AN AIRCRAFT AGAINST AN EXCESSIVE DESCENT RATE

TECHNICAL FIELD

The present invention relates to a method and a device for automatically protecting an aircraft, including a transport airplane, against an excessive descent rate.

BACKGROUND

Within the scope of the present invention, an "excessive descent rate" refers to the situation wherein, during a descent, an aircraft has, at a given height with respect to the ground, a (descent) vertical speed being excessive for such a height. The aircraft is not in principle authorized to fly at such a vertical speed at this height, in particular, due to a collision risk with the ground.

As known, numerous aircrafts are provided with a collision warning device for emitting an alarm signal in the case of a collision risk of the aircraft with the ground. Regarding the warning device, it could more specifically be a device of the TAWS ("Ground Awareness and Warning System") type, of the EGPWS ("Enhanced Ground Proximity Warning System") type or of the GCAS ("Ground Collision Avoidance System") type. Such a TAWS collision warning device is generally able to emit different types of alarms, being triggered on the base of different algorithms and information sources, i.e.:

- alarms, being triggered mainly on the base of information supplied by a radioaltimeter on-board the aircraft. There are different categories of alarms, referred to as "Mode 1" and "independent Mode 1", detecting all the potential collision risks for the aircraft with the ground, but being triggered on the basis of information supplied by different measurement chains. Thus, triggering the Mode 1 reactive alarm depends on the height of the aircraft above the ground, determined by the radioaltimeter of the aircraft, as well as the vertical speed of the aircraft supplied by on-board inertial systems. On the contrary, triggering the independent Mode 1 alarm depends, on the one hand, on the height of the aircraft above the ground, determined by GPS positioning system ("Global Positioning System"), as well as a ground data base giving the altitude of the ground and, on the other hand, on the vertical speed of the aircraft supplied by the GPS system; and
- so-called "predictive" alarms, being triggered on the base of information contained in one or more data bases (for example, of the ground, obstacle, airport runway type, . . . ).

When such an alarm (for a collision risk with the ground being flown over), is triggered, the crew should, in a very short time, analyze the situation, take a decision and act so as to lift up the nose of the airplane and optionally put the wings flat again.

The present invention aims at overcoming the above mentioned drawbacks. It relates to a method for automatically protecting an aircraft, including a transport airplane, for avoiding excessive descent rates.

SUMMARY OF THE INVENTION

To this end, according to this invention, the method for automatically protecting an aircraft against an excessive descent rate is remarkable in that the following string of successive operations is automatically carried out:

a) the current vertical speed and the current height of the aircraft are measured with respect to the ground, being referred to as current flight parameters;

b) such current flight parameters are compared with at least one flight envelope, referred to as a safety envelope, depending on an unauthorized flight envelope, the unauthorized flight envelope defining couples of vertical speed and height, illustrating an excessive descent rate and that are not authorized for the aircraft, and a protection is triggered at least if the current flight parameters are located in the safety envelope; and c) should the protection be triggered:

protecting orders are generated for controlling the control surfaces of the aircraft acting on its vertical speed, the protecting orders being such that, when they are applied to the control surfaces, the aircraft will be avoided from being located within the unauthorized flight envelope; and the protecting orders are applied to the control surfaces.

Thus, thanks to this invention, should an excessive descent rate occur, a protection is triggered and implemented, avoiding, at short term, the aircraft from being located in the unauthorized flight envelope, and this either while preventing it from getting thereinto, or making it get out, if necessary, as described below.

Such a protection having the effect of limiting the descent speed of the aircraft allows the crew, if necessary, to become aware of the actual situation and to be able to implement the maneuvers that such a situation requires, including for avoiding an impact with the ground. Such a protection could probably enable the avoidance of some collisions with the ground, when the usual collision risk alarms are emitted.

In a first embodiment, the safety envelope corresponds to the unauthorized flight envelope, to which a safety margin is added, and in step c), protecting orders are generated such that, when they are applied to the control surfaces, they prevent the aircraft from entering the unauthorized flight envelope, that is they prevent that the current vertical speed and the current height correspond to a couple of values, defined within the unauthorized flight envelope.

In such a case, preferably, in step c):

an intermediate order is determined, representing a vertical acceleration value λz, by means of the following equation:

$$\gamma z = (Vz^2 - V\max^2)/(2*h)$$

wherein:

Vz is the measured current vertical speed of the aircraft;

Vmax is the maximum vertical speed authorized at the current height according to the unauthorized flight envelope; and h is the measured current height; and such an intermediate order is converted into deflection angles of the control surfaces, representing the protecting orders.

In a second embodiment, the safety envelope represents the unauthorized flight envelope, and in step c), protecting orders are determined, such that when the orders are applied to the control surfaces, the orders avoid the aircraft from staying in the unauthorized flight envelope, making the aircraft get out of the latter.

In this second embodiment (applied to an airplane), preferably, in step c), in addition, a lateral maneuver is controlled, resulting in the wings of the airplane put flat again.

The present invention is applied, preferably, to (excessive descent rate) alarms corresponding to alarms such as the above mentioned ones, being triggered mainly on the base of information supplied by a radioaltimeter of the aircraft and/or a GPS system associated to a data base of the ground, and more particularly to "Mode 1" and "independent Mode 1" alarms.

It should be noticed that:
triggering the "Mode 1" reactive alarm depends on the height of the aircraft above the ground, determined by an radioaltimeter of the aircraft, as well as on the vertical speed of the aircraft supplied by on-board inertial systems; and
triggering the "independent Mode 1" alarm depends, on the one hand, on the height of the aircraft above the ground, determined by GPS positioning system ("Global Positioning System"), as well as a ground data base giving the altitude of the ground and, on the other hand, on the vertical speed of the aircraft also supplied by the GPS system; and In a particular embodiment:
in step a), a current auxiliary vertical speed and a current auxiliary height of the aircraft are additionally measured with respect to the ground, referred to as current auxiliary flight parameters; and
in step b), these current auxiliary flight parameters are additionally compared with at least one auxiliary safety envelope (similar to the safety envelope), and a protection is triggered, if simultaneously:
the current flight parameters are part of the safety envelope; and
the current auxiliary flight parameters are part of the auxiliary safety envelope.

Thus, in such a particular embodiment, two different (excessive descent rate) alarms are combined, preferably independent ones, in particular a "Mode 1" reactive alarm and an "independent Mode 1" alarm, allowing an excessive descent rate of the aircraft to be efficiently detected. In particular, such detection, if it achieved from information originating from different and independent measurement strings, reduces the number of untimely triggering operations.

Furthermore, advantageously, a preliminarily triggered protection is deactivated, when the conditions at the origin of its triggering are not longer fulfilled.

The present invention also relates to a device comprising:
a first device for automatically measuring the current vertical speed and the current height of the aircraft, referred to as current flight parameters;
a second device able to emit a protection trigger signal, the second device comprising elements for comparing the current flight parameters with at least one flight envelope, referred to as safety envelope, depending on an unauthorized flight envelope, the unauthorized flight envelope defining couples of vertical speed and height, illustrating an excessive descent rate and being not authorized for the aircraft, and for emitting a trigger signal at least if the current flight parameters are part of the safety envelope;
a third device for generating, should a trigger signal be emitted, protecting orders for controlling control surfaces of the aircraft acting on its vertical speed, the protecting orders being such that, when they are applied to the control surfaces, the aircraft will be avoided from being located in the unauthorized flight envelope; and
a fourth device for automatically applying the protecting orders to the control surfaces.

In a particular embodiment, the second device further comprise first auxiliary elements for measuring a current auxiliary vertical speed and a current auxiliary height of the aircraft with respect to the ground, referred to as current auxiliary flight parameters and for comparing these current auxiliary flight parameters with an auxiliary safety envelope, and second auxiliary elements for emitting a trigger signal if simultaneously:
the current flight parameters are part of the safety envelope; and
the current auxiliary flight parameters are part of the auxiliary safety envelope.

Moreover, advantageously:
the second device is either integrated into a calculator comprising the third device, or (at least partially) independent; and
the device further comprises a device for making a crew member aware, if appropriate, of the emission of a protection trigger signal.

The present invention also relates to an aircraft provided with such an above mentioned device.

BRIEF DESCRIPTION OF THE DRAWINGS

The FIGS. of the appended drawing will better explain how this invention can be implemented. In such FIGS., like reference numerals relate to like components

DETAILED DESCRIPTION

Figure 1:
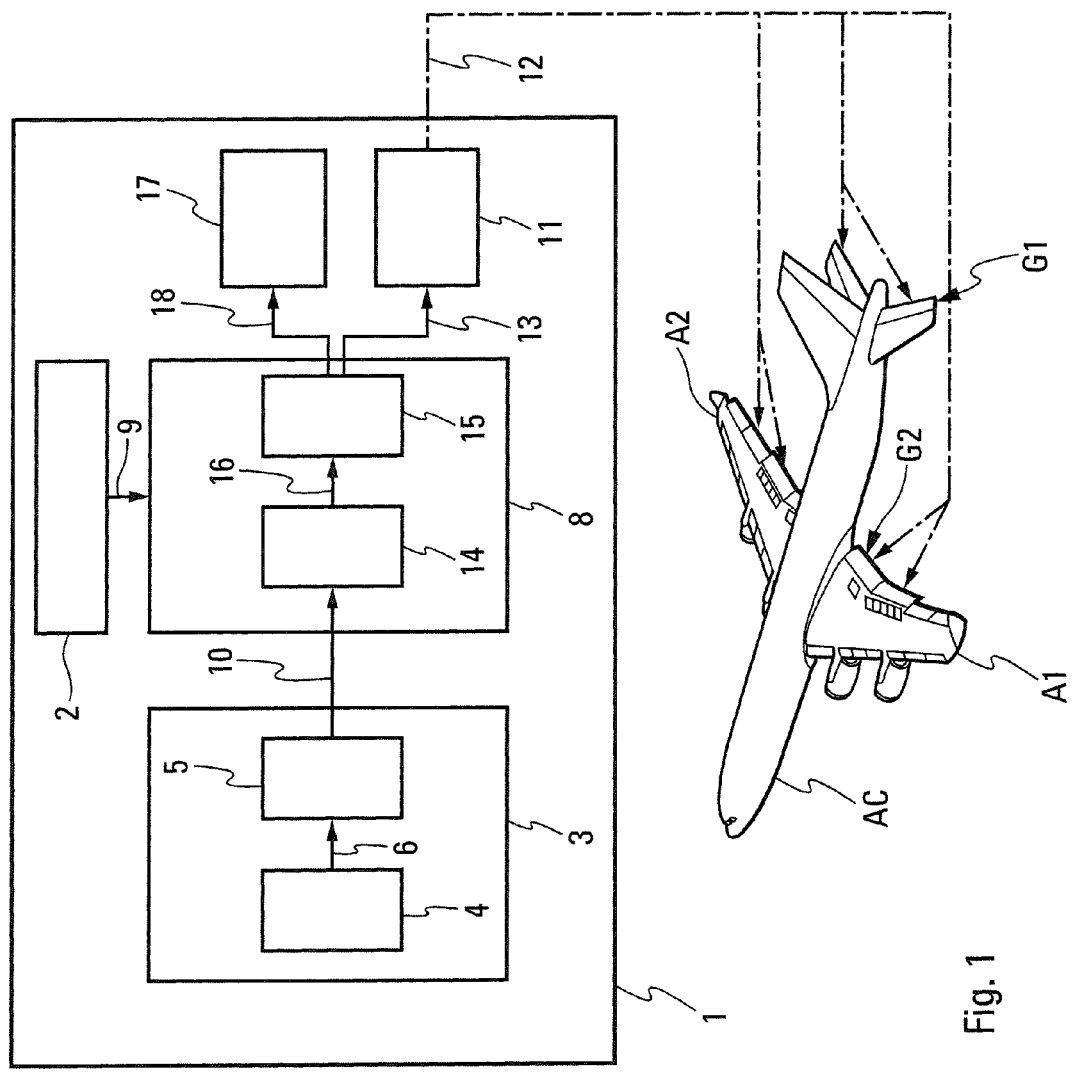
FIGS. 1 and 2 are the block diagrams of two particular embodiments of an automatic protection device according to the present invention.
Figure 2:
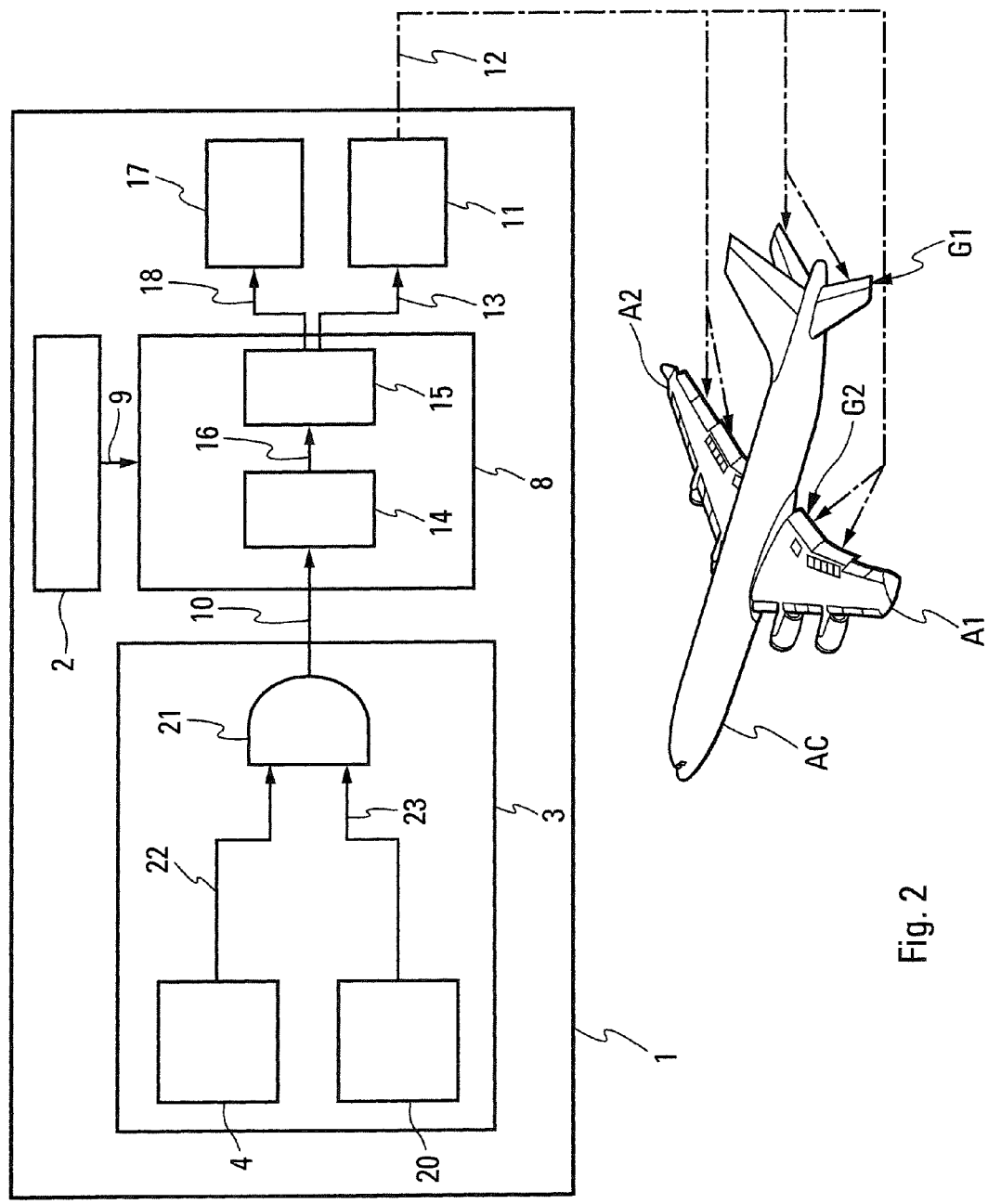

The device 1, according to this invention and schematically shown on FIGS. 1 and 2, is a device for automatically protecting an aircraft AC, in particular a transport airplane, against an excessive descent rate.

Within the scope of the present invention, the expression "excessive descent rate" refers to flight conditions of an aircraft AC upon a descent, being such that the aircraft AC has, at a given height with respect to the ground, a (descent) vertical speed being excessive for such a height. The aircraft AC is not in principle authorized to fly at such a vertical speed at this height, in particular, due to a collision risk with the ground.

On FIGS. 1 and 2, the device 1 is shown (for simplification reasons in the drawing) being outside the aircraft AC, in the present case a transport airplane, while it is actually mounted on-board the latter.

According to this invention, the on-board device 1 comprises:
a set 2 of information sources, comprising usual devices (not specifically shown) for automatically measuring the current vertical speed of the aircraft AC and usual devices (also not specifically shown) for automatically measuring the current height of the aircraft AC with respect to the ground;
a protection trigger emission device 3 being able to emit a protection trigger signal as described below. Such protection trigger emission device 3 comprise a comparing device 4 for comparing current flight parameters (current vertical speed and height) that have been measured by devices of the set 2 (and received from a non shown link) or using non shown appropriate devices, with at least one flight envelope, referred to as a safety envelope. Such a safety envelope depends on an unauthorized flight envelope. The unauthorized flight envelope usually defines couples of vertical speed and height, illustrating an excessive descent rate and not being in principle authorized for the aircraft AC. The protection trigger emission device 3 further comprise a signaling device 5, 21 being connected via a link 6, 22 to the comparing device 4 and being formed so as to emit a protection trigger signal, and this at least if the current flight parameters are part of the safety envelope;

a calculation unit 8 being connected via links 9 and 10 respectively to the set 2 of information sources 2 and to the protection trigger emission device 3 and being provided for automatically generating, should a trigger signal be emitted (by the protection trigger emission device 3), protecting orders for controlling the control surfaces G1 and G2 of the aircraft AC, acting on its vertical speed; and a set of usual surface operating devices 11 being associated respectively with the control surfaces G1 and G2 of the aircraft, and being formed so as to automatically apply the (control) orders received (via a link 13), and including the protecting orders, as illustrated via a link 12 in mixed lines, to the control surfaces G1 and G2 that, within the scope of the present invention, thus act on the vertical speed of the aircraft AC.

According to this invention, the calculation unit 8 is formed so as to generate protecting orders being such that, when they are applied to the control surfaces G1 and G2, they allow to avoid the aircraft AC from being located in the unauthorized flight envelope.

Thus, should an excessive descent rate occur, the device 1 according to this invention triggers and implements a protection that will avoid, in the short term (of the order of a few seconds), for the aircraft AC from being located in the unauthorized flight envelope, and this either preventing the aircraft from getting into the unauthorized flight envelope, or making the aircraft get out, if necessary, as described below.

Such a protection having the effect of limiting the descent speed allows the crew, if necessary, to become aware of the actual situation and to be able to implement the maneuvers that such a situation requires, including for avoiding an impact with the ground.

Furthermore, the protection according to this invention is automatically implemented by the device 1, allowing the workload of the pilot(s) of the aircraft AC to not be increased.

In a preferred embodiment, the comparing device 4 comprise at least one collision warning device, for example of the TAWS type, monitoring the flight of the aircraft AC with respect to the surrounding ground. Such a collision warning device is able to emit alarms when the aircraft AC risks a collision with a relief of the ground should such current flight characteristics (speed, slope, ... ) be maintained. This collision warning device could use the flight parameters as measured by the set 2 or be associated with particular devices for measuring flight parameters.

Obviously, despite the characteristics of such a preferred embodiment, the present invention is not limited exclusively to a flight in the vicinity of the ground.

Within the scope of the present invention:

at least some G1 of the control surfaces could represent the elevators of the aircraft AC (in the present case, an airplane) being located at the rear of such an airplane. An action on these elevators G1 thus results in the vertical speed of the airplane being indirectly piloted; and at least some G2 of the control surfaces could represent spoilers being usually mounted on the wings A1, A2 of an airplane. Such spoilers G2 have a direct effect on the lift, allowing to check the vertical speed of the aircraft AC.

In a particular embodiment, the calculation unit 8 comprises:

an intermediate order determining device 14 being formed so as to determine in real time, using the current vertical speed and the current height, measured by the set 2, an intermediate order; and a conversion device 15 being connected via a link 16 to the intermediate order determining device 14 and being formed so as to convert such an intermediate order into deflection angles of the control surfaces G1 and G2. Such deflection angles represent the protecting orders and are therefore transmitted to the surface operating devices 11 (via the link 13) for controlling the vertical speed of the aircraft AC.

The device 1 further comprise indication devices 17 being connected to the calculation unit 8, via a link 18. Such indication devices 17 allow the pilot(s) of the aircraft AC to be warned when a protection according to this invention is triggered and implemented. Such an indication could comprise a visual piece of information displayed on a viewing screen (for example mounted in the cockpit of the aircraft AC) and/or a sound alarm. Moreover, they could also allow a visual and/or a sound warning to be emitted upon alarms being emitted by a collision warning device.

The device 1 further comprises integrated devices (not specifically shown) for deactivating a preliminarily triggered protection, when the conditions resulting in it being triggered are no longer fulfilled.

In a first variation, the safety envelope corresponds to the unauthorized flight envelope, to which a safety margin has been added. In such a case, the protection is triggered when the aircraft AC gets in the safety envelope, that is before getting in the unauthorized flight envelope, and the calculation unit 8 then generate protecting orders being such that, when they are applied to the control surfaces G1 and G2, they prevent the aircraft AC from entering the unauthorized flight envelope, that is they prevent its current vertical speed and its current height from corresponding to a couple of values, defined in the unauthorized flight envelope.

Furthermore, in a second variation, the safety envelope represents the unauthorized flight envelope. In such a case, the protection is thus triggered when the aircraft AC gets in the unauthorized flight envelope, and the calculation unit 8 then determine protecting orders being such that, when they are applied to the control surfaces G1 and G2, they prevent the aircraft AC from staying in the unauthorized flight envelope, making the aircraft getting out of it. In this second variation, the device 1 comprises, preferably, integrated devices (not shown) for additionally controlling a lateral maneuver resulting in the wings of the airplane being flat again, in particular for enhancing the vertical flight abilities of the airplane. Making the wings flat again could also be provided in the first above mentioned variation.

In a first embodiment (shown on FIG. 1), the protection trigger emission device 3 only comprise the comparing device 4 for checking whether the current flight parameters are part of the safety envelope.

In this first embodiment, the intermediate order determining device 14 determine, as an intermediate order, a vertical acceleration value $\gamma z$, using the following equation:

$$\gamma z = (Vz^2 - Vcons^2)/(2*h)$$

wherein:

Vz is the current vertical speed of the aircraft AC, measured by the set 2 and received via the link 9;

h is the measured current height of the aircraft AC; and

Vcons is the maximum vertical speed authorized at the current height according to the unauthorized flight envelope.

In order to convert such a vertical acceleration value γz into deflection angles of the control surfaces G1 and G2, the conversion device 15 can multiply it by a gain depending on the characteristics of the aircraft AC, such as its mass, its speed, its balance and/or its geometric configuration. Such an intermediate order could also be sent through a stabilization automatic loop then calculating the protecting orders being necessary for reaching the corresponding vertical acceleration objective.

In a first variation of this first embodiment, the comparing device 4 are independent and represent for example a usual collision warning device, as mentioned hereinabove, whereas, in a second variation, the comparing device 4 are integrated into calculation means (comprising the protection trigger emission device and the calculation unit 3 and 8) being involved in the flight control and commands of the aircraft AC.

In a second embodiment (shown on FIG. 2), the protection trigger emission device 3 comprise in addition to the comparing device 4, an auxiliary device 20:

for measuring or acquiring a current auxiliary vertical speed and a current auxiliary height of the aircraft AC with respect to the ground, referred to as current auxiliary flight parameters; and for comparing such current auxiliary flight parameters with an auxiliary safety envelope.

The protection trigger emission device 3 further comprise a signaling device 21 comprising an AND logic gate, being connected via links 22 and 23 respectively to the comparing device and the auxiliary device 4 and 20 and being formed so as to emit a trigger signal if simultaneously:

the current flight parameters are part of the safety envelope; and the current auxiliary flight parameters are part of the auxiliary safety envelope.

If the aircraft AC is provided with at least one radio altimeter, of inertial systems and of GPS type positioning device, one of the alarms of the couple of alarms implemented respectively by the comparing device and the auxiliary device 4 and 20, could be a usual reactive Mode 1 alarm, being triggered both on the basis of height of the aircraft AC above the ground, determined by the radioaltimeter, as well as of the vertical speed of the aircraft AC supplied by the inertial systems. Furthermore, the other alarm could be, in such a case, a usual independent Mode 1 alarm, being triggered, on the basis, on the one hand, on the height of the aircraft AC above the ground, determined by the GPS positioning device as well as on a topographic data base giving the altitude of the ground and, on the other hand, on the vertical speed of the aircraft AC supplied by the GPS positioning device (derivative of the altitude).

Thus, this second embodiment, combining two different alarms respectively implemented by the comparing device and the auxiliary device 4 and 20, preferably a Mode 1 alarm and an independent Mode 1 alarm, allows to efficiently detect an excessive descent of the aircraft AC with a view to result in the protection according to this invention being triggered.

Preferably, the comparing device and the auxiliary device 4 and 20 use measurements of flight parameters, achieved by different and independent measurement strings, allowing, more specifically, the number of untimely triggering operations to be reduced.

In a first variation of this second embodiment, the comparing device and the auxiliary device 4 and 20 are independent and each represent for example a usual collision warning device, as mentioned hereinabove, whereas, in a second variation, the comparing device and the auxiliary device 4 and 20 are integrated into calculation devices (comprising the protection trigger emission device and the calculation unit 3 and 8) being involved in the flight control and commands of the aircraft AC.

The invention claimed is:

1. A method for automatically protecting an aircraft against an excessive descent rate, the method comprising the following string of successive operations:

a) measuring with a set of information sources a current vertical speed and a current height of the aircraft with respect to the ground, referred to as current flight parameters, and measuring with a different set of information sources independent from the set of information sources a current auxiliary vertical speed and a current auxiliary height of the aircraft with respect to the ground, referred to as current auxiliary flight parameters;

b) comparing with a comparing device these current flight parameters with at least one flight envelope, referred to as a safety envelope, depending on an unauthorized flight envelope, the unauthorized flight envelope defining couples of vertical speed and height, illustrating an excessive descent rate and that are not authorized for the aircraft, and separately and independently comparing the current auxiliary flight parameters with at least one auxiliary safety envelope such that comparing the current flight parameters with the at least one safety envelope is performed independently from comparing the current auxiliary flight parameters with the at least one auxiliary safety envelope, and triggering a protection only at least if simultaneously:

the current flight parameters are located in the safety envelope; and the current auxiliary flight parameters are located in the auxiliary safety envelope; and c) should the protection be triggered:

generating protecting orders automatically upon the triggering with a calculation unit for controlling the control surfaces of the aircraft acting on the current vertical speed, the protecting orders configured to cause the aircraft to avoid being located in the unauthorized flight envelope; and applying the protecting orders automatically upon generation of the protecting orders with a surface operating device to the control surfaces and without requiring added actions or workload for a crew of the aircraft.

2. The method according to claim 1, wherein the safety envelope corresponds to the unauthorized flight envelope, to which a safety margin has been added, and in step c), protecting orders are generated such that the protecting orders prevent the aircraft from getting in the unauthorized flight envelope.

3. The method according to claim 2, wherein in step c): an intermediate order is determined, representing a vertical acceleration value γz, by means of the following equation:

$$\gamma z = (Vz^2 - V\max^2)/(2*h) \text{ wherein:}$$

Vz is the measured current vertical speed of the aircraft;

Vmax is the maximum vertical speed authorized at the current height according to the unauthorized flight envelope; and h is the current measured height of the aircraft; and wherein the intermediate order is converted into deflection angles of the control surfaces, representing the protecting orders.

4. The method according to claim 1, wherein the safety envelope represents the unauthorized flight envelope, and in step c), protecting orders are generated such that the protecting orders avoid the aircraft from staying in the unauthorized flight envelope.

5. The method according to claim 4, further comprising:

in step c), a lateral maneuver is additionally controlled, resulting in wings of the aircraft being flat again.

6. The method of claim 1 further comprising:

deactivating a preliminarily triggered protection automatically when the conditions of the current flight parameters being located in the safety envelope are no longer fulfilled.

7. The method according to claim 6, wherein the safety envelope corresponds to the unauthorized flight envelope, to which a safety margin has been added, and in step c), protecting orders are generated such that the protecting orders prevent the aircraft from getting in the unauthorized flight envelope.

8. The method according to claim 7, wherein in step c): an intermediate order is determined, representing a vertical acceleration value $\gamma z$, by means of the following equation:

$$\gamma z = (Vz^2 - V\max^2)/(2*h) \text{ wherein:}$$

Vz is the measured current vertical speed of the aircraft;

Vmax is the maximum vertical speed authorized at the current height according to the unauthorized flight envelope; and h is the current measured height of the aircraft; and wherein the intermediate order is converted into deflection angles of the control surfaces, representing the protecting orders.

9. The method according to claim 6, wherein the safety envelope represents the unauthorized flight envelope, and in step c), protecting orders are generated such that the protecting orders avoid the aircraft from staying in the unauthorized flight envelope.

10. The method according to claim 9, further comprising:

in step c), a lateral maneuver is additionally controlled, resulting in wings of the aircraft being flat again.

11. A device for automatically protecting an aircraft against an excessive descent rate, the device comprising:

a first device for automatically measuring the current vertical speed and the current height of the aircraft, referred to as current flight parameters;

first auxiliary elements for measuring a current auxiliary vertical speed and a current auxiliary height with respect to the ground of the aircraft, referred to as current auxiliary flight parameters, the first auxiliary elements independent from the first device;

a second device able to emit a protection trigger signal, the second device including a comparing device that configured to compare the current flight parameters with at least one flight envelope, referred to as a safety envelope, depending on an unauthorized flight envelope, the unauthorized flight envelope defining couples of vertical speed and height, illustrating an excessive descent rate and not being authorized for the aircraft, and the comparing device also configured to compare the current auxiliary flight parameters with an auxiliary safety envelope separately and independent from the comparing of current flight parameters to the at least one flight envelope, the second device also including a signaling device for emitting a trigger signal only if simultaneously:

the current flight parameters are located in the safety envelope; and the current auxiliary flight parameters are located in the auxiliary safety envelope;

a third device for automatically generating, upon emitting of the trigger signal, protecting orders for controlling control surfaces of the aircraft acting on the current vertical speed, the protecting orders configured to cause the aircraft to avoid being located in the unauthorized flight envelope;

a fourth device for automatically applying the protecting orders to the control surfaces upon generation of the protecting orders and without requiring added actions or workload for a crew of the aircraft.

12. The device according to claim 11, wherein the second device is independent and distinct from the third device.

13. The device according to claim 11, wherein the second device is integrated into a calculator comprising the third device.

14. The device according to claim 11, further comprising:

an indication device for making a crew member aware of the emission of the trigger signal by the signaling device.

* * * * *